US005453614A

United States Patent [19]

La Fontaine et al.

[11] Patent Number: 5,453,614

[45] Date of Patent: Sep. 26, 1995

[54] MASS SPECTROMETRY PROBE, PARTICULARLY IN MAGNETIZED PLASMA

[75] Inventors: Antoine C. La Fontaine, Lekremlin Bicetre; Michel Patris, Limours, both of France

[73] Assignees: Commissariat A L'Energie Atomique, Paris; Compagnie Generale Des Matieres Nucleaires, Velizy Villacoublay, both of France

[21] Appl. No.: 250,421

[22] Filed: May 26, 1994

[30] Foreign Application Priority Data

Jun. 10, 1993 [FR] France .................................. 93 06976

[51] Int. Cl.$^{6}$ ............................ B01D 59/44; H01J 49/40

[52] U.S. Cl. .......................... 250/296; 250/288; 250/281

[58] Field of Search .................................. 250/281, 283, 250/288, 296

[56] References Cited

U.S. PATENT DOCUMENTS

| | | | |
|---|---|---|---|
| 3,816,748 | 6/1974 | Harrison | 250/296 |
| 3,863,068 | 1/1975 | Poschenriedes | 250/287 |
| 4,843,239 | 6/1989 | Liebl | 250/281 |

OTHER PUBLICATIONS

"La Separation Isotopique par Resonance Cyclotronique Ionique", Pierre Louvet, Clefs CEA, No. 14, Automne 1989, pp. 30–37.

"Space Science Instrumentation", vol. 2, No. 4, Sep. 1974, pp. 499–521.

"Journal of the Optical Society of America", vol. 70, No. 6, Jun. 1980, pp. 716–719.

"Review of Scientific Instruments", vol. 59, No. 8, Aug., 1988, pp. 1376–1379.

French Search Report—FA490563-FR 9306976—Feb. 15, 1994.

*Primary Examiner*—Bruce C. Anderson
*Attorney, Agent, or Firm*—Pearne, Gordon, McCoy & Granger

[57] ABSTRACT

This probe, which is to be placed in a uniform magnetic field, comprises an ion acceleration zone, a circular sector (6) polarized so as to create in the zone an accelerating electric field, an ion collector (8), a conducting grid (36) at the entrance to the zone for fixing the potential at said entrance, the distance between said grid and the sector being adequate to ensure that the ions drift into the zone from their incidence position on the grid. The sector has an entrance slit (38) displaced with respect to said incidence position in order that the electric field is uniform in the acceleration zone.

6 Claims, 2 Drawing Sheets

MASS SPECTROMETRY PROBE, PARTICULARLY IN MAGNETIZED PLASMA

Figure 1:
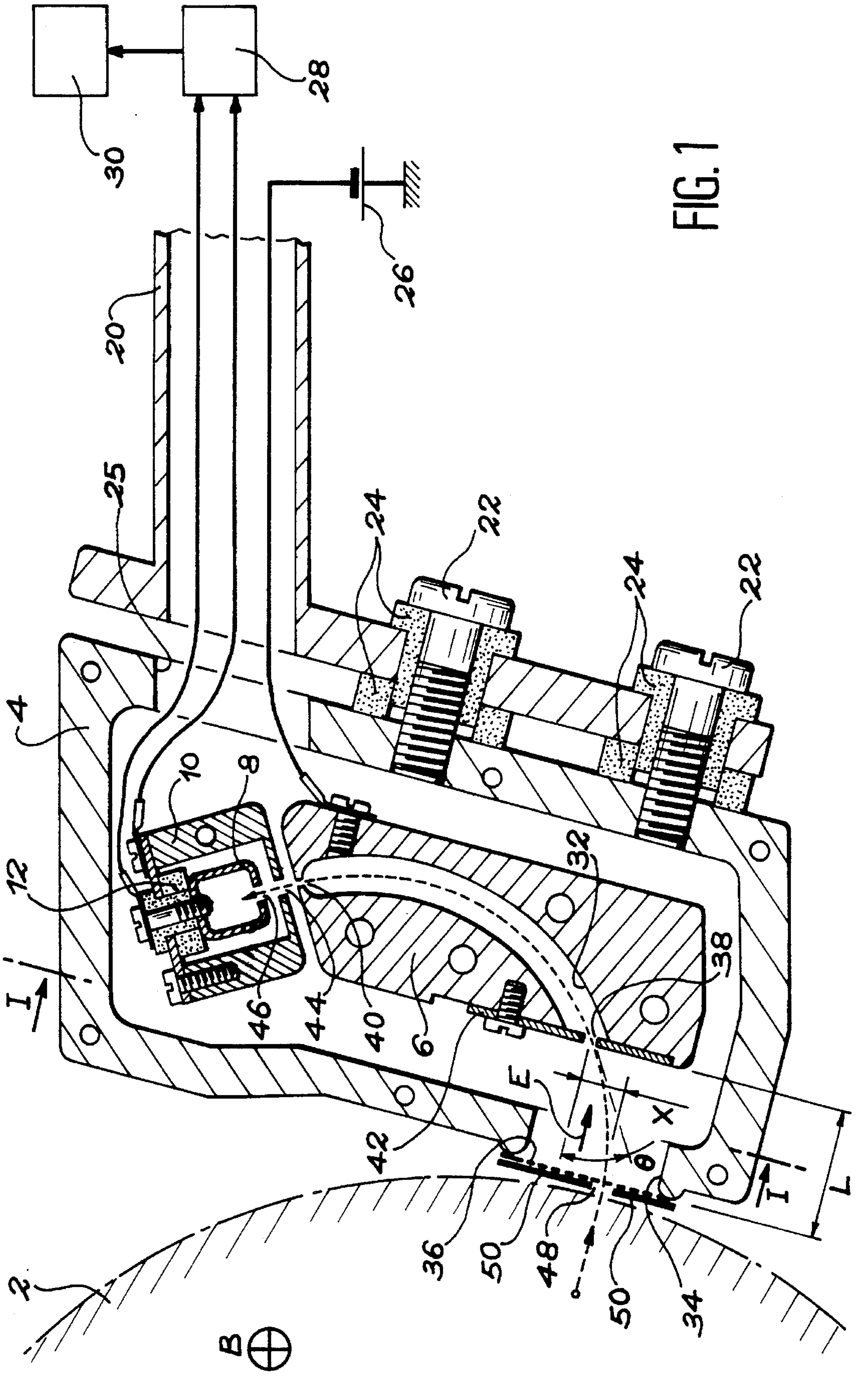

The present invention relates to a mass spectrometry probe, particularly in a magnetized plasma.

The invention is more particularly applicable to the identification of mono-charged and multi-charged ion species in a Q machine plasma and to the measurement of the relative ion densities of said species.

As a function of the sought physical information type, the probe according to the invention can be displaced in the plasma perpendicular to the axis of the magnetic field of the Q (quiescent) machine or parallel to said axis. With said probe, the measurements are performed in real time and it is e.g. possible to detect an untimely arrival of air or water in the enclosure where the plasma is formed.

The probe according to the invention is usable in an ion cyclotron resonance installation and in general terms in plasmas immersed in a uniform magnetic field.

The invention is generally used in a toroidal plasma (of the type formed in magnetic fusion equipment), the probe then being positioned on the periphery of said plasma.

A Q machine makes it possible to produce a highly magnetized, very stable plasma (the magnetic field being typically a few tenths of a Tesla to a few Teslas) and the aim is to identify in the said plasma the different ionic species with the different charge states present and to measure their relative quantities. To do this, it is appropriate to use in the static magnetic field of the machine a small probe, so as to disturb the plasma to the minimum extent.

A mass spectrometry probe is already known from: (1) The article by D. M. SUSZCYNSKY et al entitled "Mass spectrometer for measurements of relative ion concentrations in plasmas", published in Rev. Sci. Instrum. 59 (8), August 1988, pp 1376 to 1379.

This known probe makes it possible to measure the relative ionic densities of a binary plasma, whose two components are initially known (in this document it is a question of $K^+$ and $Cs^+$) .

With said known plasma, the collected ion current is in the form of saturation plateaus, whose relative heights are a function of the relative ionic densities (by means of calibration factors).

The field of application of such a probe is limited, because it must be previously calibrated for each of the ionic components. Moreover, these components must have a significant mass difference, otherwise the ionic saturation plateaus cannot be distinguished from one another. Therefore, the resolution of this probe is very low.

The known probe also excessively disturbs the plasma due to its relatively large dimensions (diameter 10 cm, length 18 cm).

Another mass spectrometry probe is known from (2): Article by J. O. BERG et al, entitled "Identification of UIII and UIV lines", published in J. Opt. Soc. Am., vol. 70, No. 6, June 1980, pp 716–719. This known probe, whose dimensions are small, is used in the measurement of the mass/atomic number ratio of ionic species in an ion cyclotron resonance isotopic separation installation.

For this purpose, it comprise a 90° circular sector, whose radius is 1.1 cm and which is polarized to a variable voltage and uses the static magnetic field of the coil of the installation.

This sector has a face facing the plasma and which is set back with respect to the latter, by using a skimmer at a floating potential and has a hole. The ions are accelerated in the zone defined by the skimmer. An ion collector is placed at the outlet from the circular sector.

The length of the skimmer, corresponding to the ion acceleration length, is small (1 mm), so that the hole has a small diameter (250 μm), without which the accelerating electric field would be excessively disturbed. There is also an uncertainty with respect to the electric potential value at the plasma-vacuum interface.

As a result of the small diameter of the hole, the sector supplies the collector with a low ionic current. To obviate this disadvantage use is made of a collector with a considerable width (3 mm) compared with the sector radius and consequently the probe has a poor resolution (approximately 1 to 2).

The object of the present invention is a mass spectrometry probe, whose sector is able to supply an ionic current higher than that supplied by the sector of the probe described in document (2) and which, in a preferred embodiment, has a better resolution than the probe described in (2).

In order to increase the ionic current, the probe according to the invention and which is to be placed in a uniform magnetic current and which comprises, like that of document (2), an ion accelerating zone, a circular sector having an entrance opening facing said zone and an exit opening, said sector to be polarized so as to create in the zone an electric field perpendicular to the magnetic field and which accelerates the ions in the direction of the sector, an ion collector placed facing the exit opening of said sector and only those ions having a given charge:mass ratio for a given polarization of the sector, reaching said collector after traversing the sector, is characterized in that it also comprises an electrically conductive grid, placed at the entrance of the zone and which serves to fix the electrical potential at said entrance, the distance between said grid and the sector being adequate to ensure that the ions drift into the zone from their incidence position on the grid, in that the entrance opening of the sector is displaced with respect to this incidence position so that the electric field is uniform in the acceleration zone, said entrance opening forming a slit parallel to the magnetic field and in that the spacing of the grid does not exceed approximately 1/10 of the length of the acceleration zone or approximately 1/10 of the drift length in said zone.

Thus, by increasing the length of the acceleration zone compared with document (2), it enables the ions to drift or migrate into said zone (there being virtually no drift in the probe of document (2)), which displaces the entrance opening of the circular sector and thus makes it possible to increase the size of said opening (which is a slit instead of a small diameter, circular hole as in document (2)), without this disturbing the electrical acceleration field of the ions in the main part of their trajectory.

The size increase of the opening leads to a rise in the ionic current supplied by the sector to the collector.

Moreover, by having a strong ionic current exiting the sector, it is possible to diaphragm said exit. According to a preferred embodiment of the probe according to the invention, the exit opening of the sector is a slit, which is parallel to the entrance slit of said sector and whose width is at the most equal to the width of said entrance slit. Thus, there is an increase in the resolution compared with that of the probe of document (2).

Preferably, the probe according to the invention also comprises a Faraday cage for protecting the ion collector against parasitic electric currents liable to appear between the sector and the collector.

Also in preferred manner, the probe according to the invention also has a slit parallel to the entrance slit of the sector and which is placed in front of the grid so as to select the ions liable to reach the collector and stop the other ions.

According to a special embodiment of the probe according to the invention, the angle of the circular sector is substantially 180° and according to another embodiment said angle is substantially 90°.

The invention is described in greater detail hereinafter relative to non-limitative embodiments and with reference to the attached drawings, wherein show:

FIG. 1 A diagrammatic sectional view of a special embodiment of the probe according to the invention.

Figure 2:
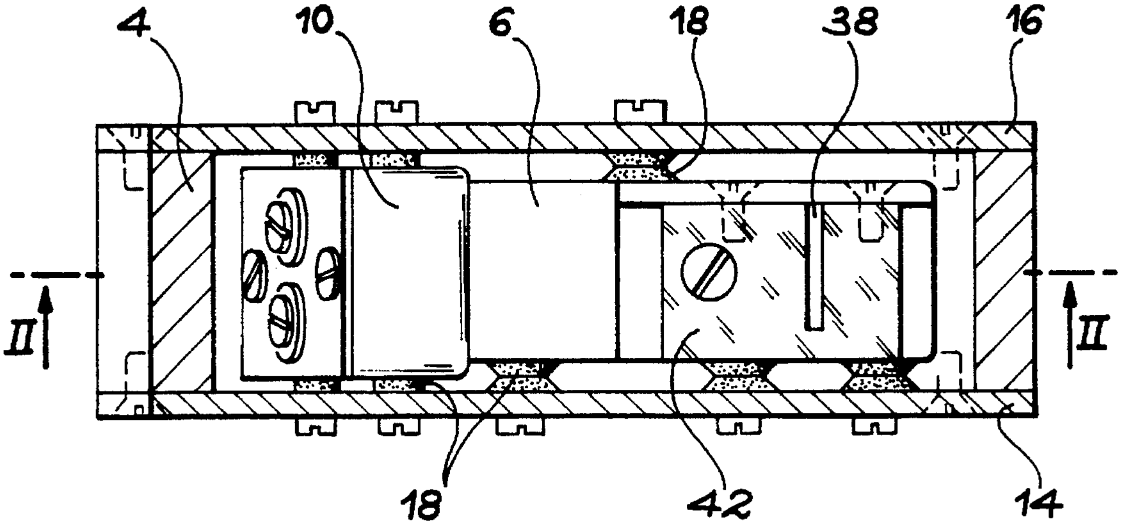

FIG. 2 The section I—I of FIG. 1.

Figure 3:
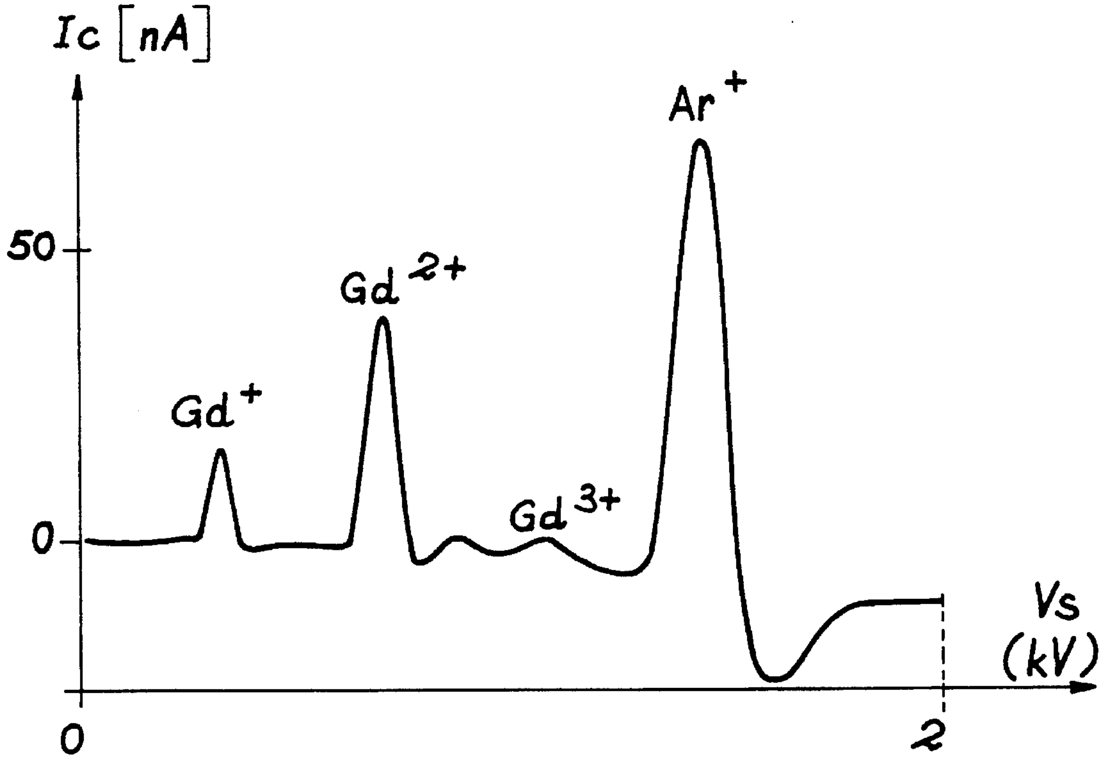

FIG. 3 Variations of the collected current as a function of the polarization voltage of the sector of a probe according to the invention.

The mass spectrometry probe according to the invention and which is diagrammatically shown in FIG. 1 (section II—II of FIG. 2) and in FIG. 2 (section I—I of FIG. 1) is intended to be used for analyzing the ionic composition of a plasma 2, whose shape is e.g. substantially cylindrical (the plasma axis being perpendicular to FIG. 1) and for this purpose said probe is placed on the periphery of the plasma.

In addition, said plasma is exposed to a uniform magnetic field B parallel to the axis of the plasma and the probe of FIGS. 1 and 2 uses, for its operation, said uniform magnetic field.

This probe comprises a metal case 4 forming a probe body and which is grounded or placed at floating potential and, in said probe body, has a circular metal sector 6, whose angle is substantially 90°, an ion collector 8 and a Faraday cage 10, which is at floating potential. The ion collector 8 is fixed in the interior of the Faraday cage 10 and is electrically insulated therefrom by means of electrically insulating elements 12.

The case 4 is closed by covers 14, 16 and the circular sector 6, as well as the Faraday cage 10 are fixed within the said case and are electrically insulated therefrom by a plurality of electrically insulating elements 18, as shown in FIG. 2.

As can be seen in FIG. 1, the probe according to the invention is mounted on a metal support 20, which makes it possible to radially displace said probe in the plasma. The support 20 is a tubular support, which is grounded and fixed, by means of screws 22, to the probe body 4 and is electrically insulated therefrom by electrically insulating elements 24. The probe body 4 has a perforation 25 facing an open end of the tubular support 20 and which makes it possible to pump within the probe body 4.

In order to carry out measurements with the probe shown in FIGS. 1 and 2, use is made of a high voltage source 26, which serves to raise the circular sector 6 to a high negative potential making it possible to accelerate the ions of the plasma and use is also made of a nanoammeter 28, which is electrically connected to the ion collector 8 for measuring the collected ionic current and which is provided with a plotting table 30 making it possible to plot the variations of the collected ionic current as a function of the accelerating voltage to which the circular sector 6 is raised.

The corresponding electrical connections traverse the perforation 25 and then the tubular support 20 and are electrically insulated therefrom by not shown means.

The circular sector 6 has a passage 32 for the ions and said passage has a circular arc shape, said circle having an axis parallel to the magnetic field B.

The case 4 has an opening 34 penetrated by the ions from the plasma. The opening 34 is closed by an electrically conductive grid 36, which is at the same potential as the case 4 and is placed at the interface between the plasma and the vacuum prevailing within the case 4.

The passage 32 has a first slit-like opening 38 parallel to the magnetic field B, facing the grid 36, and a second opening 40 also in the form of a slit parallel to the slit 38 and whose width is less or approximately the same as the slit 38. The slit 38 is formed in a plate 42, which is fixed to the circular sector 6 and is at the same potential as the latter, as can be seen in FIG. 1.

The Faraday cage 10 has an opening 44 in the form of a slit parallel to the slit 40 and slightly larger than the latter and facing the slit 40 and the ion collector 8, which is located within the Faraday cage 10, also having a slit 46 parallel to the slit 44 and facing the latter.

As will become more apparent hereinafter, this enables certain ions of the plasma to successively traverse the grid 36, the slit 38, the passage 32 and the slits 40, 44 and 46 and then are collected and give rise to an ionic collecting current which is measured with the nanoammeter 28.

In the zone between the grid 36 and the plate 42 provided with the slit 38, the polarization of the circular sector 6 produces an electrical field E perpendicular to the magnetic field B, which accelerates the ions towards the plate 42 and which is substantially uniform in said ion accelerating zone.

Only the ions having a given q/m ratio (in which q represents the charge of an ion and m its mass), for a given polarizing voltage Vs applied to the circular sector 6, reach the collector 8 after traversing said circular sector.

The following formula applies:

$$R=.44\times10^{-2}B^{-1}(m.Vs.Z^{-1})^{1/2}$$

in which R represents the radius of the circular sector in cm, the magnetic field B is in Teslas, the voltage Vs in volts, the mass m in atomic mass units and Z representing the atomic number of the ion.

The distance L between the grid 36 and the plate 42 (acceleration zone length) is sufficiently large for the ions to drift into said zone (with a speed vector proportional to the vector product of the electrical field and the magnetic field).

The length X over which the ions drift into said acceleration zone perpendicular to the magnetic field and to the electrical field is given by the following formula:

$$X=R^2(\pi/2-\text{Arcsin}\ (1-2L^2/R^2))/(2L)-(R^2-L^2)^{1/2}.$$

The incidence angle θ of the ions on the slit 38 with respect to the direction perpendicular to the plate 42 is given by the following formula:

$$\theta=\text{Arctg}\ (R/L)^2-1)^{-1/2}.$$

FIG. 1 shows that the entrance slit 38 of the circular sector 6 is displaced by the length X with respect to the incidence position (slit 48) of the ions on the grid 36, which enables the electrical field to be substantially uniform in the acceleration zone.

It is pointed out that the spacing of the grid 36 (mesh length of said grid) does not exceed 1/10 of the length L of the acceleration zone or 1/10 of the drift length X in the acceleration zone.

The grid 36 is used for fixing the electric potential at the entrance of the acceleration zone, which makes it possible to calculate the trajectories of the ions in said zone.

There is also a slit 48 at the entrance of the acceleration zone. The slit 48, which is parallel to the magnetic field B and defined by two metal plates 50 in contact with the grid 36 and which is traversed by the ions before they traverse the grid 36, serves to essentially select the ions not striking the walls of the circular passage 32 and for stopping the other ions.

It should be noted that in advantageous manner a self-cleaning phenomenon takes place during the operation of the probe shown in FIGS. 1 and 2. With a metallic plasma, there is no obstruction of the grid during the operation of the probe (whereas deposits are formed, which have no prejudicial effect, on the outer part of the probe in contact with the plasma).

Thus, the transmission of the probe of FIGS. 1 and 2 does not deteriorate in time.

In a purely indicative and non-limitative manner, the radius R of the circular sector is 1.9 cm instead of 1.1 cm in the probe of document (2), which leads to a better resolution than that obtained with the probe of (2). The length L of the acceleration zone is 1.1 cm, instead of 1 mm in the probe described in document (2). This enables the ions to drift over a length X of 3.85 mm in the acceleration zone, the incidence angle θ being 31°. This drift or migration of the ions leads to a displacement of the entrance opening of the circular sector 6 with respect to the incidence position of the ions on the grid, which makes it possible to use a 0.6 mm wide slit 38 as the entrance opening, so that there is a widening compared with the circular opening of the probe of document (2) and without any significant disturbance to the accelerating electric field E in the acceleration zone, such a widening making it possible to increase the ion flux penetrating the sector. The spacing of the grid is 250 um and the width of the slit 48 is 2 mm. It is therefore possible to obtain a collected current higher by a factor of 30 than that obtained with the probe described in document (2) and a resolution, which is better by an order of magnitude, than that of the known probe.

The voltage supply 26 is able to supply a d.c. voltage and has means making it possible to linearly vary said voltage during a period of time between 0 and 2 kV (voltage ramp).

It is therefore possible to scan, bearing in mind a radius R of 1.9 cm in the above example, a wide ionic species range (with the different charge states) from $^{6}Li$ to $^{157}Gd$ for a magnetic field between 0.4 and 3 T.

With an exit slit 40 from the circular sector 6 with a width of 0.5 mm and a length of 9 mm, the collected ionic current of the majority ion peak typically varies by 0.1 to 1 microampere for an ionic density of the plasma of a few $10^{11}$ $cm^{-3}$ and the detection threshold is approximately 100 pA.

FIG. 3 shows a spectrum example obtained with a probe according to the invention (variation of the collected current in nanoamperes as a function of the sector polarization voltage Vs in kV). With a plasma containing Gd and At, it is clearly possible to distinguish the $Gd^{+}$, $Gd^{2+}$, $Gd^{3+}$ and $Ar^{+}$ ions (magnetic field value: $B \approx 1.9$ T).

Using in the probe of FIGS. 1 and 2 slits with a length of 9 mm, the axial ion drift length parallel to the magnetic field B is small, approximately 1 to 2 mm, compared with said slit length.

It should also be noted that in order to have a significant resolution drop due to space charge phenomena, it would be necessary for the collected current to be at least 10 microamperes with the numerical values given hereinbefore. This fixes the field of use of the probe of FIGS. 1 and 2.

As it has been experimentally possible to obtain a value of approximately 0.5 microampere for the collected current for a plasma density of approximately $5 \times 10^{11}$ $cm^{-3}$, the space charge effect is negligible.

Instead of using a circular sector with an angle of substantially 90°, it is possible to use a circular sector with an angle of substantially 180°. This leads to a doubling of the resolution of the probe.

However, the maximum space charge current is reduced by half and the axial drift length is doubled. The overall dimensions are also larger than with a probe having a circular sector with an angle of approximately 90°.

We claim:

1. Mass spectrometry probe to be placed in a uniform magnetic field, said probe comprising an ion acceleration zone, a circular sector (6) having an entrance opening (38) facing said zone and an exit opening (40), said sector intended to be polarized so as to create in the zone an electrical field perpendicular to the magnetic field and which accelerates the ions in the direction of the sector and an ion collector (8) positioned facing the exit opening of the sector (6), whereby only the ions having a given charge:mass ratio for a given polarization of the sector reach the collector after traversing said sector, said probe being characterized in that it also comprises an electrically conductive grid (36) placed at the entrance of the zone and which serves to fix the electric potential at said entrance, the distance (L) between said grid and the sector being adequate to ensure that the ions drift into the zone from their incidence position on the grid, in that the entrance opening (38) of the sector is displaced with respect to said incidence position so that the electric field is uniform in the acceleration zone, said entrance opening forming a slit parallel to the magnetic field and in that the spacing of the grid (36) does not exceed approximately 1/10 of the length (L) of the acceleration zone or approximately 1/10 of the drift length (X) in said zone.

2. Probe according to claim 1, characterized in that the exit opening of the sector (6) is a slit (40) parallel to the entrance slit (38) of said sector and whose width is at the most equal to the width of said entrance slit.

3. Probe according to claim 1, characterized in that it also comprises a Faraday cage (10) for protecting the ion collector (8) against parasitic electric currents liable to appear between the sector (6) and said collector.

4. Probe according to claim 1, characterized in that it also comprises a slit (48) parallel to the entrance slit of the sector, which is placed in front of the grid (36) and which selects the ions liable to reach the collector (8) and stops the other ions.

5. Probe according to claim 1, characterized in that the angle of the circular sector (6) is substantially 180°.

6. Probe according to claim 1, characterized in that the angle of the circular sector (6) is substantially 90°.

* * * * *